United States Patent [19]

Mohan et al.

[11] Patent Number: 5,170,480
[45] Date of Patent: Dec. 8, 1992

[54] CONCURRENTLY APPLYING REDO RECORDS TO BACKUP DATABASE IN A LOG SEQUENCE USING SINGLE QUEUE SERVER PER QUEUE AT A TIME

[75] Inventors: Chandrasekaran Mohan, San Jose; Ronald L. Obermarck, Redwood City; Richard K. Treiber, San Jose, all of Calif.

[73] Assignee: International Business Machines Corporation, Armonk, N.Y.

[21] Appl. No.: 411,729

[22] Filed: Sep. 25, 1989

[51] Int. Cl.$^5$ .................. G06F 15/40; G06F 15/417; G06F 12/00; G06F 12/16
[52] U.S. Cl. .................. 395/600; 395/575; 395/250; 364/282.1; 364/285.3; 364/DIG. 1; 371/8.1; 371/29.1; 371/16.5
[58] Field of Search ............... 364/200, 900; 395/800, 395/600, 575, 250, 650; 371/8.1, 29.1, 16.5

[56] References Cited

U.S. PATENT DOCUMENTS

| | | | |
|---|---|---|---|
| 4,159,517 | 6/1979 | Paradine et al. | 364/200 |
| 4,435,762 | 3/1984 | Milligan et al. | 364/200 |
| 4,498,145 | 2/1985 | Baker et al. | 364/900 |
| 4,507,751 | 3/1985 | Gawlick et al. | 364/900 |
| 4,509,119 | 4/1985 | Gumaer et al. | 364/200 |
| 4,710,870 | 12/1987 | Blackwell et al. | 364/200 |
| 4,819,159 | 4/1989 | Shipley et al. | 364/200 |
| 4,868,744 | 9/1989 | Remsch et al. | 364/280 |
| 4,878,167 | 10/1989 | Kapulka et al. | 364/200 |
| 4,881,163 | 11/1989 | Thomas et al. | 395/250 |
| 4,881,166 | 11/1989 | Thompson et al. | 395/600 |
| 4,930,072 | 5/1990 | Agrawal et al. | 364/300 |
| 4,941,087 | 6/1990 | Kap | 364/200 |
| 4,949,251 | 8/1990 | Griffin et al. | 364/200 |
| 4,965,719 | 10/1990 | Shoens et al. | 395/650 |
| 5,001,628 | 3/1991 | Johnson et al. | 364/200 |
| 5,005,122 | 4/1991 | Griffin et al. | 364/200 |
| 5,043,866 | 8/1991 | Myre, Jr. et al. | 395/600 |
| 5,095,421 | 3/1992 | Freund | 395/650 |

OTHER PUBLICATIONS

U.S. Patent Application Ser. No. 07/059,666 filed Jun. 8, 1987 Inventors: Haderle, et al., Group Art 231 A Parallel Logging Algorithm for Multiprocessor Database Machines, by Rakesh Agrawal, AT&T Bell Laboratories pp. 256–276.

Recovery Architectures for Multiprocessor Database Machines, Rakesh Agrawal, et al., 1985 ACM, pp. 131–145.

Design Considerations in Replicated Database Systems for Disaster Protection, Jim Lyon, 1988 IEEE, pp. 428–430.

Global Recovery in a Distributed Data Base System, Bernd Walter, DDSS, 1982, pp. 68–81.

Consistency and Recovery Control for Replicated Files, Danco Davcev et al. AMC, 1985, pp. 87–96.

*Primary Examiner*—Lawrence E. Anderson
*Assistant Examiner*—Alpesh M. Shah
*Attorney, Agent, or Firm*—Baker, Maxham, Jester & Meador

[57] ABSTRACT

Change processing of a replica database is accomplished by separating redo records obtained from the transaction log of a primary database into respective queues. The redo records are separated such that all transaction records for a unit of transfer (page) of the primary database are placed on the same queue in log sequence. Each queue is linked exclusively to one of a plurality of parallel queue servers. Each queue server applies to the replica database the redo records in the queues which it exclusively serves. The replica database is thereby made consistent with the primary data by a lock-free updating mechanism which services the pages of the replica database in parallel.

5 Claims, 3 Drawing Sheets

CONCURRENTLY APPLYING REDO RECORDS TO BACKUP DATABASE IN A LOG SEQUENCE USING SINGLE QUEUE SERVER PER QUEUE AT A TIME

BACKGROUND OF THE INVENTION

The invention is in the field of transaction processing, and more particularly concerns the maintenance of consistency between a primary database and a replica database by applying in parallel to the replica database, redo records from the transaction log of the primary database.

In the prior art of transaction processing, a primary database may be replicated at a remote location. The purpose of the remote database may be to provide backup to the primary database in the event of media failure in the primary. In order to ensure consistency between the database and its replica, processing of the primary database must be reflected in the replica database. Throughput for application of record processing to the replica must be at least as good as that achieved by the transaction processing system for the primary database; resource consumption at the replica processing should be low relative to the consumption of the transaction processing system as a whole. Serialization is required to ensure that the database is transaction-consistent with, and identical to, the primary database. Availability for the primary database should not be reduced by the addition of transaction processing for the replica.

In the prior art, database replication is exemplified in the use of synchronous distributed database technology. The System R STAR prototype of the IBM Corporation is a synchronous distributed database system which has provision for storing a consistent copy of a database in two locations. However, in their present practice, synchronous distributed database systems require the exchange of a significant number of messages to effect the processing required for maintaining consistency between the databases, and utilize database serialization in the form of locking.

Database media recovery processing includes the well-known forward recovery process in which a database unit is reconstructed by updating an earlier version with recovery data recorded in a log, or journal. In this regard, the original version of the database unit is saved in stable storage. When a failure destroys the current copy of a database, the last current version of the database unit is reconstructed by restoring the saved version of the unit and then applying from the log changes to the saved version in the same order in which they were made to the lost version.

Use of forward recovery in a synchronous distributed database "mirrors" the original transaction processing. Since changes to the primary database are logged in the same sequence in which they occurred, the log data could be processed in parallel by first obtaining the locks originally held, and then passing from the log, the redo records in parallel. In this operation, a single recovery process would handle all records for a given transaction, holding all the locks for that transaction until the reconstruction is completed, and then releasing the locks. This recovery solution is limited by the fact that all locks for a particular transaction must be obtained by a single process to ensure that lock conflicts do not occur that would prevent replication of the original sequencing. This retards parallelism until after locks are obtained, and prevents performance of any work if any lock is unavailable.

In pending U.S. patent application Ser. No. 07/059,666, now abandoned, assigned to the assignee of this patent application, use is made of multiple queues of log records to be reapplied to a database during restart processing. It is pointed out in this application that updates to different database units can be applied in different orders than the order represented in the log without violating any correctness properties.

Agrawal, in "A Parallel Logging Algorithm for Multi-Processor Database Machines", DATABASE MACHINES: Fourth International Workshop, March, 1985, propounds the parallel writing of log records to multiple logs but, during recovery, processes these logs serially through a single "back-end" processor. In Lyon, "Design Considerations in Replicated Database Systems for Disaster Protection", IEEE Computer Conference, Spring, 1988, it is stated that a remote database facility extracts updates from an active database's journal and applies them to a backup database.

SUMMARY OF THE INVENTION

This invention is based upon the observation that advantage can be taken of the inherent sequencing of recovery records on a transaction log to support efficient and highly parallel application of changes that will ensure consistency of a replicated database with an original database.

DESCRIPTION OF THE PREFERRED EMBODIMENT

Figure 1:
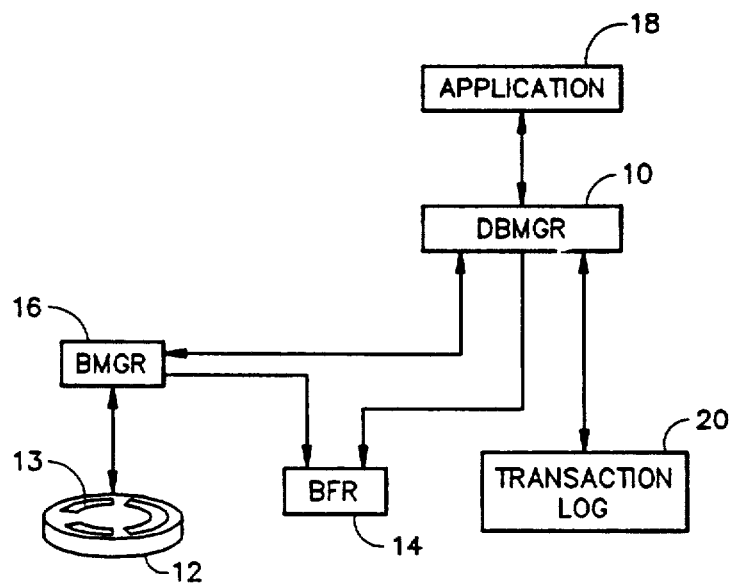
FIG. 1 illustrates prior art transaction processing system in the form of a database management system.

FIG. 1 illustrates a prior art database management system which supports transaction processing of database records. In FIG. 1, the database management system includes a database manager (DBMGR) 10 which manages access to, and processing of, a database held in stable storage, which can comprise a DASD 12. The database being managed is stored in stable storage in units of transfer. Relatedly, a unit of transfer is the basic unit which the manager will bring out of stable storage for transaction processing. In the prior art, the "page" is the usual unit of transfer. A page corresponds to a physically defined storage area on the DASD 12. One of these storage areas is indicated by 13.

A database unit of transfer is brought out of stable storage 12 and lodged in the buffer (BFR) 14 in active memory. One or more records in the page of memory brought into the buffer 14 is processed and the page is returned to its corresponding storage sector in the stable storage 12. Transfers between the stable storage 12 and the buffer 14 are handled by a buffer manager (BMGR) 16, operating under control of the DBMGR 10.

This basic complement of parts is available to an application program 18 which specifies to the DBMGR a transaction and a subject record. The DBMGR 10 calls the BMGR 16 to transfer to the buffer 14 the page containing the subject record. When the page is placed in the buffer 14, the subject record is processed according to the transaction required by the application 18, and the updated page is over-written into its corresponding stable storage sector.

A system failure can interrupt the operation of the database system of FIG. 1 before an updated page is transferred back to the stable storage 12 from the buffer, after a transaction changing the page in the buffer has been completed. It is this situation which the recovery function of the DBMGR 10 is invoked to rectify.

Recovery processing requires the maintenance of a transaction log 20 in stable storage. Upon the transaction log 20 is recorded every completed transaction in the form of log records. A log record can include UNDO and REDO components. The UNDO component of a log record is a replica of a database record prior to being changed by a transaction. The REDO component is a copy of the record after the change.

Figure 2:
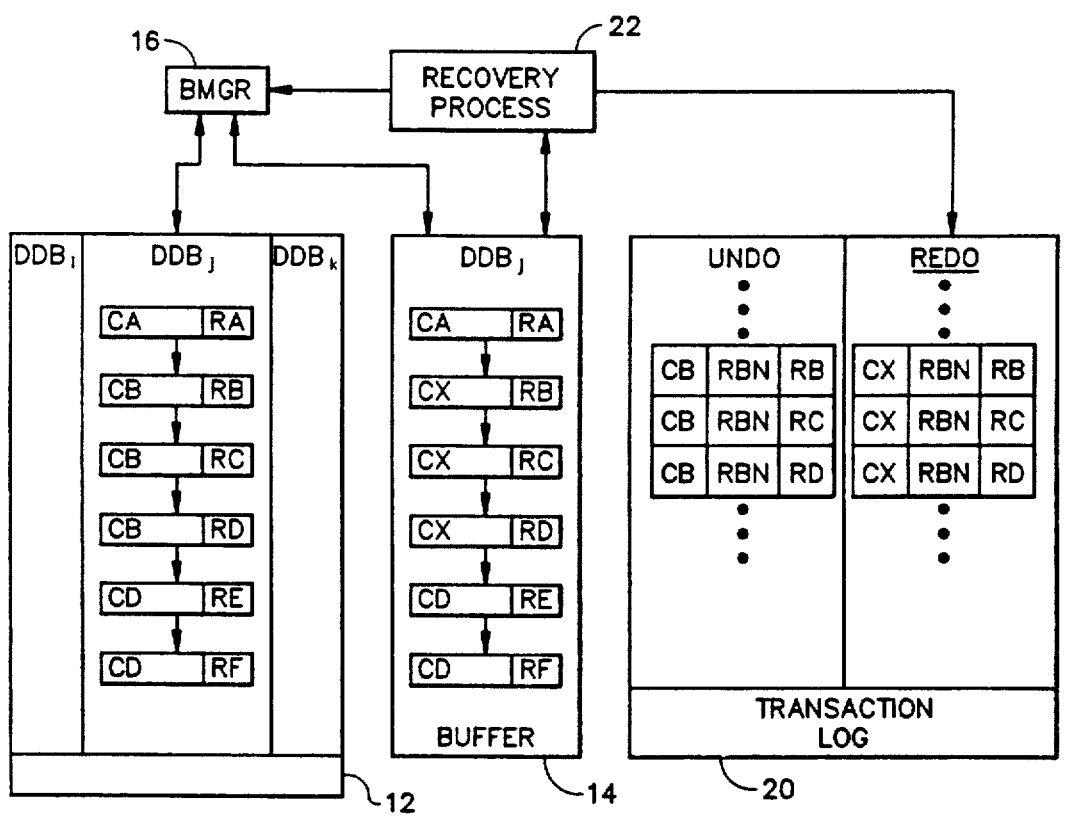
FIG. 2 is a block diagram illustrating details of the database management system of FIG. 1.

As illustrated in FIG. 2, a media recovery process 22 performs "forward" recovery using the REDO records of the transaction log 20. As an example, assume that records, identified by record numbers RA-RF are included in the defined data block j (DDB$_j$) which is included in a data set stored in the stable storage 12. Assume next a transaction against records RB-RD of DDB$_j$, and that the records are to be updated as a result of the transaction. For updating, BMGR 16 transfers the page DDB$_j$ to the buffer 14 in real memory, where the records RB-RD are updated, in each case by changing record data CB to CX. During the processing of these records, log entries are made in the sequence in which the records were updated. Each record update results in the writing of an UNDO and REDO record to the transaction log 20. For example, the transaction log entry for updating record RB includes an UNDO record with a field containing the record data before updating (CB) a field identifying the record (RB), and a field containing a relative block number (RBN) which identifies the location of the stable storage page containing the record. The REDO component of the log record includes a field containing the update of the record data (CX) and the RBN and RB fields identifying, respectively, the page and the record. Assuming completion of the transaction or set of transactions which update records RB-RD, BMGR 16 will copy the page DDB$_j$ to the buffer 14, where the recovery process will use the transaction log REDO records to update records RB-RD. The BMGR 16 will then write the buffer page to the stable storage location for DDB$_j$.

It is noted that the media recovery process 22 can also comprise a "backward" recovery process in which records updated by uncompleted transactions will be restored to their prior condition by use of the UNDO records.

Forward and backward recovery functions are available in database products manufactured by the IBM Corporation. Forward and backward recovery are supported in the database manager of the IBM DB2 and IMS/ESA program products. In these products, UNDO records are logged in addition to REDO records. If a transaction associated with a REDO record ABORTS, the record data from the UNDO record is logged as a REDO record and is applied to the database, thus "backing-out" the original update to the record. In the FAST PATH database manager of the IBM IMS/ESA program products, UNDO records are not logged. Rather, changes are withheld from the database until REDO records have been logged and the updating transactions have completed. Relatedly, in the prior art, successful completion of the transaction is indicated by a COMMIT operation which is recorded by a COMMIT record in the transaction log. If the transaction is abnormally terminated after the record is changed, an ABORT record is entered in the log.

INVENTION AND INDUSTRIAL APPLICATION

Figure 3:
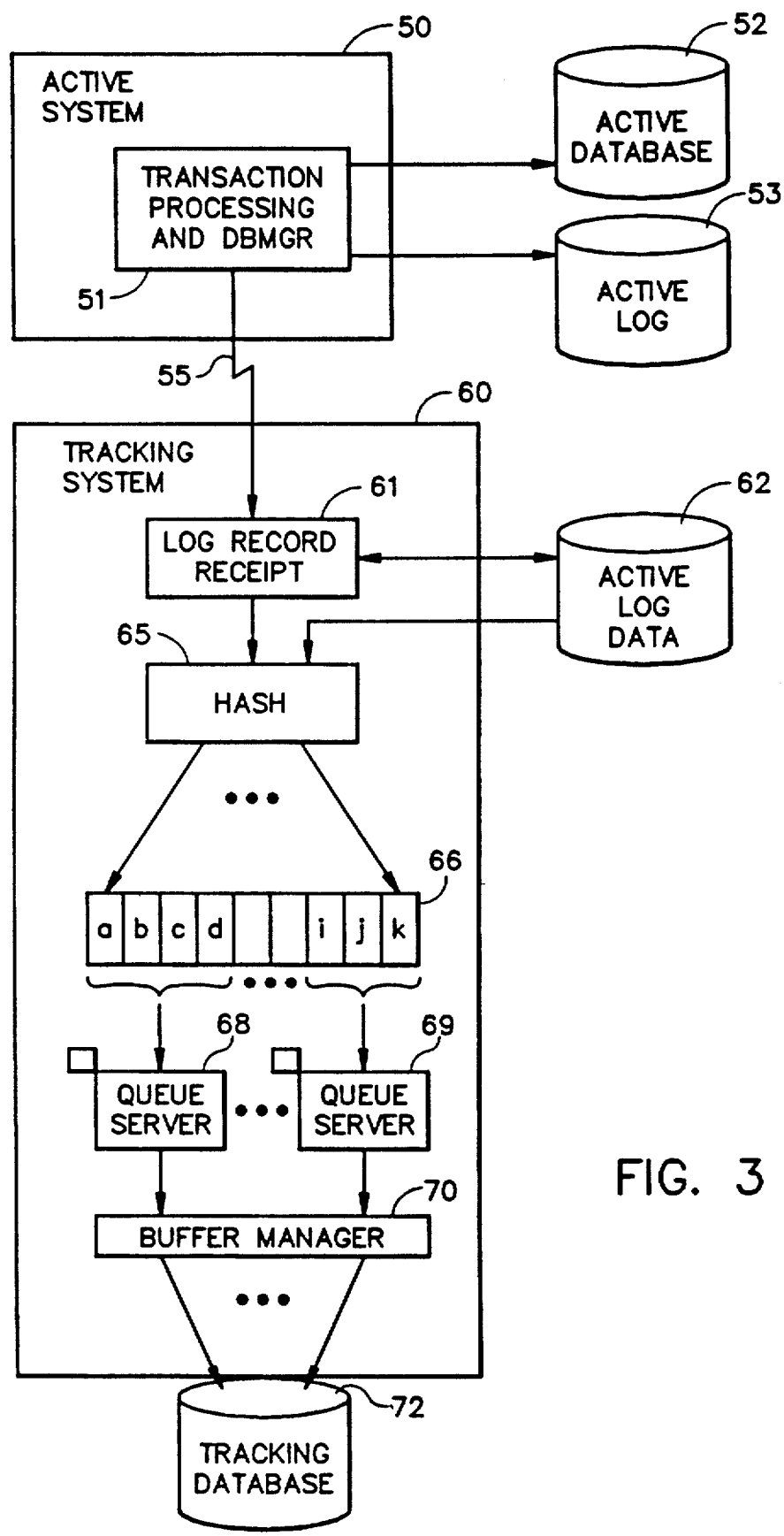
FIG. 3 is a block diagram illustrating the interconnection of the prior art database management system of FIG. 1 with the invention.

The invention is illustrated in FIG. 3 as a tracking system which operates in conjunction with an active system to maintain a tracking database which is a replica of the primary database maintained by the active system. The active system 50, which can include one of the IBM database products described above executing in a computing system such as the IBM SYSTEM 370 has a system component 51 for conducting transaction processing and database management. The system component 51 maintains and updates an active database 52 and also an active log 53. As REDO records are entered on the active transaction log 53, the system 50 provides those records through a communication component 55 to the tracking system 60.

The invention is expressed in the tracking system 60. The tracking system 60 includes a process 61 for receiving REDO records written to the active log 53. The process 61 writes the REDO records, in the sequence in which they are entered into the active log 53, onto an active log data facility 62, which can include stable storage, such as DASD. A hash process 65 obtains, in sequence, the REDO records entered into the active log data facility 62 and enqueues them onto a plurality of REDO record queues 66.

The hashing process 65 is conventional. In this regard, the hashing process 65 can include a division/-remainder process, which operates on the relative block number of each REDO record to create a new key value for each record. Assuming execution of the hashing process 65 in a database management system of the IMS/VS type available from the assignee of this patent application, the database system includes an access method interface (AMI) for moving the REDO records from the queues 66 to input/output devices. As is known, a subset of the IMS REDO records which the IMS AMI serializes represents the creation of new key values in a index. Since the application of new key values is to a particular index, the hashing process 65 operates such that all "new key" REDO records for a given index are placed on a single one of the queues 66.

The queueing function is implicit in the redo record queues 66, and can include any one of several techniques to ensure proper sequencing of the enqueued records during dequeueing activity by a queue server (described below).

As thus far described, the invention guarantees that all REDO records associated with a single page will be placed on the same queue. It is accepted that the hashing process 65 may result in one queue containing REDO records associated with more than one page; however, the invention ensures that all REDO records associated with the pages which hash to that queue will be attached to it.

Next, the invention guarantees that REDO records are placed on their respective queues and subsequently applied in the same sequence as they are placed on the active transaction log 53.

The invention carries out the second guarantee by providing only a single queue server for any one of the queues 66. Thus, queues a, b, c, and d in the set of record queues 66 are served only by queue server 68, while queues i, j, and k are served only by the queue server 69. Thus, each one of the record queues 66 has only a single queue server. However, a single queue server can process records from more than one queue.

The queue servers, such as servers 68 and 69, operate to dequeue REDO records which are on the queues 66 and apply those REDO records to the tracking database 72 through the buffer manager 70. The buffer manager 70 is conventional, as is the tracking database 72. Conventional channelized I/O serves to buffer REDO records from the record queues 66 to stable storage containing the tracking database 72.

Once commutated to the queues 66, the REDO records are applied to the tracking database 72 by the queue servers. For example, the REDO records in queue b are obtained, one-by-one, by the queue server 68 and then used to update their respective pages. The sequence in which these changes occurred in the active system is preserved on the active transaction log 53, through the record transfer process to the tracking system 60, and on the active log data set 62. The records are hashed in their record log sequence onto the record queues 66. Consequently, the correct chronological update activity for each unit of transfer (page) is reflected by the REDO record sequence on the queue associated with the unit of transfer.

As FIG. 3 illustrates, the queue servers 68 and 69 operate in parallel. Such parallel operation can be supported by provision of, for example, different CPUs in a multi-CPU computer facility. Thus, each of the queue servers 69 removes REDO records from the queues that it serves and applies those records to the tracking database 72. Asserting once again that the queue servers operate in the IMS/VS environment, the buffer manager 70 will be called by a server to obtain a buffer containing the current value of the block identified by the relative block number of the REDO record currently held by the server. Conventionally, the buffer manager 70 either finds the block in its pool or transfers it from the tracking database 72 to active storage for application of the record. The queue server applies the redo record to the page contained in the buffer and returns the page to the buffer manager 70, which then writes the page to the appropriate sector in the tracking database 72.

While redo records are being applied to the tracking database 72, the database state is inconsistent in that at any given instant, only a portion of the changes made by a transaction have been applied to a page. Since there are no locks held to shield these inconsistencies, normal database services must be denied access to the tracking database 72. For disaster recovery applications, this presents no drawback since consistency is only required at the point the disaster occurs, and recovery using the tracking database 72 is initiated. In other respects, database consistency can be obtained at any time using a method that takes into account the recovery mechanisms used in the active system. Relatedly, for a database system in which UNDO records are not logged, the hashing process 65 must hold REDO records from the active log database 62 until a transaction COMMIT is detected. Then the hashing process will enqueue the REDO records associated with the transaction into the redo record queues 66. To obtain a transaction consistent state for the database 72, processing of active log data will be stopped until all REDO record queues are empty.

For a database manager whose log records include UNDO and REDO records, the REDO records are enqueued as they arrive and, therefore, applied to the tracking database 72. To obtain transaction consistency, active log data processing is halted when all REDO record queues are empty and standard backout logic for all uncommitted transaction is performed by applying UNDO records through the queues 66 for all uncommitted transactions in reverse sequence.

As thus described, the invention provides significant advantages over alternate procedures for maintaining tracking databases. Foremost, synchronization is not required between active database updates and update of the tracking database. Availability and performance benefits flow from this: update of the active database can occur even if the tracking database is not available; transfer of REDO records to the tracking database can be blocked or batched for efficiency. Of equal significance is the elimination of the requirement for serialization, thus avoiding cost and delay. Since typical database support waits when input or output are required, the multiple parallel queue servers are able to acquire parallel I/O resources to speed up the application of queued records to the tracking database. As FIG. 3 illustrates, the invention is easily implemented. As those skilled in the art will appreciate, the performance aspects of the invention enjoy the benefits of low pathlength since locking is not required and high throughput based on parallelism of the queue servers.

BEST MODE OF PRACTICE

Figure 4:
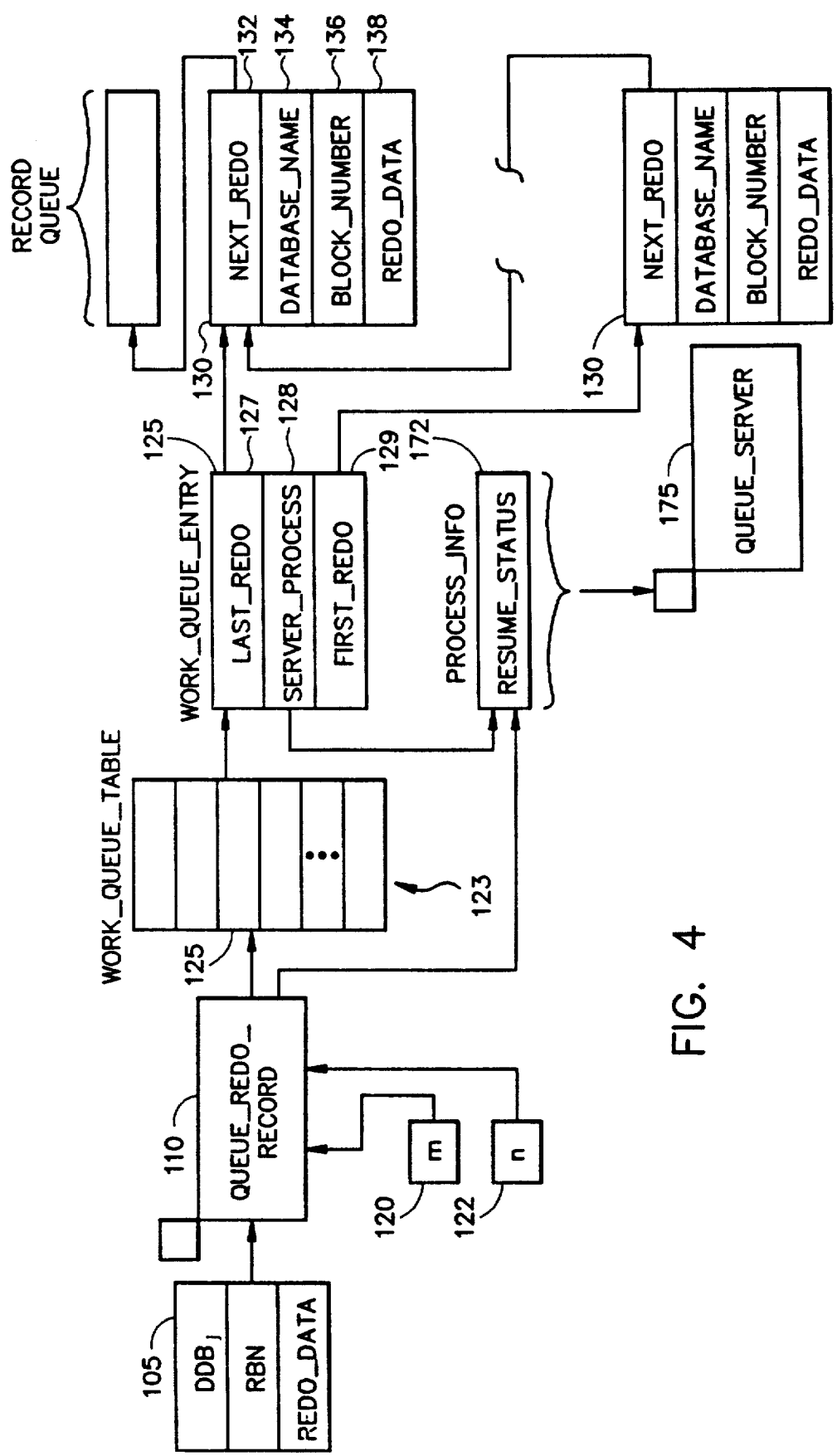
FIG. 4 illustrates the structure of a queue used by the invention.

FIG. 4 illustrates the best mode of practicing the invention described above. In FIG. 4, a REDO record 105 is passed to a process QUEUE_REDO_RECORD 110. The process 110 passes the REDO record 105 to the appropriate queue, while preserving the original transaction log sequence to ensure a correct database. The process 110 includes a hashing procedure that divides the record block number (RBN) of the REDO record 105 by a number n in a data object 122 which is labelled NUMBER_OF_QUEUES. The index obtained is used with a WORK_QUEUE_TABLE 123 to identify a specific WORK_QUEUE_ENTRY 125. The indexed WORK_QUEUE_ENTRY 125 has pointers 127 and 129 to the last and first REDO record 130 in the particular record queue headed by the WORK_QUEUE_ENTRY 125. The WORK_QUEUE_ENTRY 125 also includes a SERVER_PROCESS 128 pointing to a PROCESS_INFO control block for a queue server process 175. The queue server process 175 is awakened by setting the RESUME_STATUS flag 172 in the PROCESS_INFO control block for the server. It is asserted that each queue server has its own PROCESS_INFO control block, and that each WORK_QUEUE_ENTRY identifies only a single queue server by way of its SERVER_PROCESS field.

Refer now to Table I for an illustration of the QUEUE_REDO_RECORD process 110.

TABLE I

| | QUEUE_REDO_RECORD |
|---|---|
| 200 | QUEUE_REDO_RECORD(redo_record). |
| | /* Input is a REDO record, this routine is */ |
| | /* executing under the log record receipt process |
| 201 | index = |

TABLE I-continued

QUEUE_REDO_RECORD

```
           REMAINDER(redo_record.block_number,
           number_of_queues).
202        retry20:
203        temp =
           work_queue_table(index).work_queue_entry.last_redo.
204        redo_record.next_redo = temp.
205        CS(temp,POINTER(redo_record),
           work_queue_table(index).work_queue_entry.last_redo).
           /* Atomically add the REDO record to a last-in, */
           /* first-out chain of REDO records off of the */
           /* work queue associated with the REDO record. */
206        IF fail = ON THEN
207        GOTO retry20. /* atomic operation failed */
208        IF work_queue_table(index).work_queue_entry.server
           _process process_info.resume_status = OFF THEN
           RESUME(work_queue_table(index).work_queue_
           entry.server_process).
           /* if server process for this work queue may */
           /* suspend, resume it to process the added work*/
*/209      END QUEUE_REDO_RECORD.
```

Table I implements the QUEUE_REDO_RECORD process 110 in conventional pseudo code. The function of this procedure is to pass a REDO record to the appropriate queue server process, while preserving the original transaction log sequence. In the best mode of this invention, the REDO record is placed on an appropriate WORK_QUEUE and execution of the associated queue server process is resumed if the process is suspended or may suspend without examining the appropriate WORK_QUEUE.

In Table I, statement 201 identifies the specific WORK_QUEUE_ENTRY 125 by obtaining an index into the WORK_QUEUE_TABLE 123. The index is generated by dividing the REDO record RBN by the value in the NUMBER_OF_QUEUES data object 122 and using the remainder as the index. The required property of the hashing technique is that all REDO records that alter the same database block (page, or unit of transfer) have the same hash value, which will index those records to the same WORK_QUEUE.

Statements 202-207 use the well-known compare-and-swap instruction to place the new REDO record in an ordered WORK_QUEUE. The ordering in the queue is, preferably, last-in-first-out. Statement 208 checks to see if the queue server process associated with the WORK_QUEUE has suspended execution before detecting the work just added to the queue. If suspension is possible, an operating system RESUME function would be issued to set the RESUME_STATUS flag 172 ON and resume execution of the queue server process 175 if it has suspended or is suspending operation. Those skilled in the art will appreciate that the combination of queueing work using an atomic instruction of the compare-and-swap kind and resuming execution is a well-known technique for passing work from one process to another. Process suspension and resumption are standard services provided by conventional computer operating systems.

Refer now to Table II for an illustration of the QUEUE_SERVER 175 of FIG. 4.

TABLE II

QUEUE SERVER

```
300   QUEUE_SERVER(first_entry_index,number_of_entries,
      process_info).
      /* This routine can apply redo records from one or */
      /* more work queues in the work_queue_table. */
      /* The process under which this routine is invoked */
```

TABLE II-continued

QUEUE SERVER

```
      /* is the only process serving these particular */
      /* work queues. */
301   last_entry_index = first_entry_index + number_
      of_entries - 1.
302   top:
303   process_info.resume_status = OFF.
304   DO index = first_entry_index TO last_entry_index
      BY 1.
305   IF work_queue_table(index).work_queue_entry.last_
      redo is not null THEN
306   DO.
      /* work has been found, do not suspend at end */
      /* of this pass through the queues. */
307   Atomically remove entire list from
      work_queue_table(index).work_queue_entry.
      last_redo.
      /* The list just removed is in LIFO order. */
308   Reorder the list of redo records to FIFO order
      chained off of work_queue_table(index).work_
      queue_entry.first_redo.
      /* We now have one or more redo records */
      /* chained in the order that we must process */
      /* them. */
309   DO WHILE(work_queue_table(index).work_
      queue_entry.first_redo is not equal to null).
310   Remove first redo_record from
      work_queue_table(index).work_queue-entry.first_
      redo.
311   block_pointer = OBTAIN_BLOCK(redo-record.
      database_name.redo_record.block_number).
      /* Obtain a pointer to a copy (ocated in */
      /* main memory) of the physical block to */
      /* which the changes in the redo record */
      /* apply. */
312   Alter the block using redo_record.redo_data.
313   RELEASE_BLOCK(block_pointer).
      /* Allow the block to be written to stable */
      /* storage such as a disk device. */
312   END. /* apply REDO records for a queue */
315   END. /* found a queue with work. */
316   END. /* loop through queues. */
317   IF process_info.resume_status = OFF THEN
      SUSPEND(process_info.resume_status).
      /* wait for work if none could have been queued */
      /* while we were checking the queues. */
318   GOTO top.
      /* We do not show logic to stop this process. */
319   END QUEUE_SERVER
```

In order to apply REDO records to the tracking database 72 of FIG. 3, one or more queue server processes are required. In a reasonably large system, multiple processes will be required in order to apply records at a rate approaching the rate at which the active system 50 creates them. The prior art includes the capability of dynamically determining and changing the number of queue server processes according to system activity. Further, assignment of a particular work queue to a particular server process can be changed for load balancing using known functions. Table II simplifies the queue server logic for illustration purposes, showing an implementation where the NUMBER_OF_QUEUE_SERVER_PROCESSES 120 is fixed at a value, m, chosen by the installation and assignment of queues to queue server processes is done at system initialization.

Although FIG. 4 does not illustrate the parallel queue server architecture of FIG. 3, it is understood that the Figure, in combination with Table II, demonstrates the function and structure of a single queue server which can be replicated to provide the parallelism in the tracking system 60 of FIG. 3.

At any one time, each queue server process has the sole responsibility for one or more of the work queues.

The number of queues, then, is greater than or equal to the number of queue server processes.

In the invention, a simple incremental loop can be used to start the server processes, assigning to each one or more specific work queues, beginning with work queue 0 and ending with work queue n−1 where n is the magnitude of the data object 122. Each process will have an associated PROCESS_INFO control block that can be located from the field 128 of a WORK_QUEUE_ENTRY such as 125. When each process is given control, it invokes the QUEUE_SERVER of Table II, passing it the work queue index value, 0 to n−1, (assigned to the process) a number of entries value of 1, and its PROCESS_INFO 172.

As explained above, Table II shows an implementation of a queue server in conventional pseudo code. The function of the procedure is to apply REDO records to the appropriate tracking database blocks such that, when all REDO records have been applied, the content of the tracking database will be the same as the content of the active database.

Statement 303 sets RESUME_STATUS 172 to OFF to ensure that any subsequent addition of REDO records by a process 110 will cause the process 175 to RESUME in case the process 175 had already looked for records before they were added to a queue.

Statement 304 initiates a loop for examining each WORK_QUEUE_ENTRY in the Table 125 for which the process 175 is responsible. Statement 305 checks a particular WORK_QUEUE_ENTRY for REDO records that must be applied. If there are REDO records enqueued, an atomic instruction sequence is used to remove all records from the multi-process shared list header LAST_REDO 127. Once removed, the list is processed to reverse the sequence of the records, while chaining them off of the unshared list header FIRST_REDO 129. The list of records beginning at FIRST_REDO 129 will then contain REDO records for particular database blocks (pages) such that changes are applied to a particular block (page) in the same sequence as they were applied in the active system.

Statements 309-314 remove REDO records from the list sequence and apply their REDO_DATA fields 138 to the appropriate database identified in the DATABASE_NAME field 134 of the record. Statement 311 shows the use of an OBTAIN_BLOCK function to locate a main memory copy of the desired database block. The OBTAIN_BLOCK and RELEASE_BLOCK functions are typical of database system buffer management components in that they manage a pool of buffers, reading and writing from the stable copy of databases on external media, such as DASD. While the logic of the active system 50 would serialize access to a particular database block in the active database 52 by using a lock, the logic of the tracking system 60 requires no serialization of access to the particular database block since only a single queue server process will access this particular database block. Statement 312 applies to changes from REDO_DATA field 138 to the memory copy of the database block.

Statement 317 invokes the operating system's SUSPEND function if the QUEUE_REDO_RECORD process 110 had not queued additional REDO records and RESUMED (statement 208 in Table I) the queue server process, since the queue process set RESUME_STATUS to OFF in statement 203. If RESUME had been issued already, or when it is issued, Statement 318 is reprocessed and causes the Table III queue server to continue serving queues by looping through statement 302.

While we have described several preferred embodiments of our invention, it should be understood that modifications and adapations thereof will occur to persons skilled in the art. Therefore, the protection afforded our invention should only be limited in accordance with the scope of the following claims.

I claim:

1. In a transaction processing system including a first database system including a first database in which records are stored in units of transfer, a second database system including a second database which is a replica of said first database, and a transaction log coupled to said first database which contains a sequence of redo records representing changes made to said first database, a system for updating said second database to make it consistent with said first database, said system comprising:

a plurality of queues for receiving transaction log records;

distribution means coupled to said transaction log and linked to said queues for placing said redo records on said queues such that all redo records corresponding to a respective unit of transfer in said first database are placed on the same queue in their log sequence; and a plurality of parallel queue server means coupled to said second database, each queue server means linked to a plurality of respective queues for concurrently applying the redo records from said respective queue to said second database such that there is a single queue server for any queue, whereby redo records are applied to the second database in same sequence as they were placed on transaction log.

2. The transaction processing system of claim 1, in which said distribution means includes a hashing process.

3. The transaction processing system of claim 1, in which each of said queue server means updates a unit of transfer in said second database by applying to the records in said unit of transfer changes which are represented by the redo records for said unit of transfer in the queue linked to said queue server means.

4. A method for ensuring consistency between a first database in which records are stored in units of transfer and a second database which is a replica of said first database, said method being executed by a transaction processing system which includes a transaction log, a means for enqueing transaction log records and a plurality of queue servers, said method comprising the steps of:

accumulating a sequence of redo records in a transaction log corresponding to changes made to said first database;

maintaining a plurality of redo records queues;

placing redo records for any respective unit of transfer of said first database on only one such queue; and concurrently applying redo records from two or more such queues to said second database, wherein redo records from any one of said queues are applied to said second database by only a respective one of said queue servers in said transaction processing system such that transaction log sequence is maintained.

5. A method for updating a local database, said method being executed by a database system which includes a transaction log, a means for enqueing transaction log records and a plurality of server processes and comprising the steps of:

受信 — receiving redo log records in a transaction log from an active database in which records are stored in units of storage with which the local database is to be maintained consistent;

creating two or more queues of such redo log records;

storing redo log records for any unit of storage on only one such queue; and simultaneously applying redo log records from two or more such queues to the local database using two or more server processes, wherein redo log records from any one queue are applied to the database by only one server process at any given time such that transaction log sequence is maintained.

* * * * *

UNITED STATES PATENT AND TRADEMARK OFFICE
CERTIFICATE OF CORRECTION

PATENT NO. : 5,170,480

DATED : December 8, 1992

INVENTOR(S) : Mohan et al

It is certified that error appears in the above-identified patent and that said Letters Patent is hereby corrected as shown below:

Column 10, line 58, please change "records" to --record--.

Column 12, line 4, there should be a paragraph break between "and" and "simultaneously"

Signed and Sealed this

Thirtieth Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,170,480
DATED : December 8, 1992
INVENTOR(S) : C. Mohan

It is certified that error appears in the above-identified patent and that said Letters Patent is hereby corrected as shown below:

Column 10, line 33, please change "queue" to "queues"

Signed and Sealed this

Nineteenth Day of April, 1994

Attest:

BRUCE LEHMAN

*Attesting Officer*       *Commissioner of Patents and Trademarks*